(12) United States Patent
Nakanishi et al.

(10) Patent No.: US 7,317,612 B2
(45) Date of Patent: Jan. 8, 2008

(54) DISPLAY DEVICE

(75) Inventors: Norio Nakanishi, Chiba (JP); Takeharu Furusawa, Mobara (JP)

(73) Assignee: Hitachi Displays, Ltd., Chiba-ken (JP)

( * ) Notice: Subject to any disclaimer, the term of this patent is extended or adjusted under 35 U.S.C. 154(b) by 695 days.

(21) Appl. No.: 10/934,691

(22) Filed: Sep. 7, 2004

(65) Prior Publication Data

US 2005/0068717 A1    Mar. 31, 2005

(30) Foreign Application Priority Data

Sep. 26, 2003   (JP)   ............. 2003-334885

(51) Int. Cl.
*G06F 1/16*   (2006.01)
(52) U.S. Cl. .............. 361/681; 361/816; 174/35 GC
(58) Field of Classification Search ............. 361/681, 361/816; 174/35 GC
See application file for complete search history.

(56) References Cited

U.S. PATENT DOCUMENTS 7,197,338 B2 *   3/2007   Ozawa   .............. 455/566

FOREIGN PATENT DOCUMENTS

JP   2003-241170   2/2002

* cited by examiner

*Primary Examiner*—Jayprakash Gandhi
*Assistant Examiner*—Ingrid Wright
(74) *Attorney, Agent, or Firm*—Reed Smith LLP; Stanley P. Fisher, Esq.; Juan Carlos A. Marquez, Esq.

(57) ABSTRACT

A resin two-panel intergral-type holder holds first and second display panels of different sizes on two surfaces. The holder has a first bank-like rib which surrounds at least three sides of a periphery of the first display panel and defines first accommodating region and a second bank-like rib which surrounds at least three sides of a periphery of the second display panel and defines a second accommodating region. A conductive sheet member is formed on a first portion of another surface corresponding to the first accommodating region except for the second accommodating region and a second portion of another surface corresponding to the second accommodating region respectively. The conductive sheet member contacts another surface. A notch is formed in the second bank-like rib to electrically connect the first and second portions of the conductive sheet member.

10 Claims, 12 Drawing Sheets

DISPLAY DEVICE

The present application claims priority from Japanese application JP2003-334885 filed on Sep. 26, 2003, the content of which is hereby incorporated by reference into this application.

BACKGROUND OF THE INVENTION

The present invention relates to a flat panel display device which uses a display panel, and is particularly suitable for a display device provided with a two-panel integral-type holder which holds a first display panel on one surface and a second display panel having a size smaller than a size of the first display panel on another surface.

Various types of flat panel display devices such as a display device which can perform a color display of high definition for a notebook type computer or a display monitor, a liquid crystal display device which uses a liquid crystal panel as a display panel for a mobile phone, an organic electroluminescence display device (organic EL display device) which uses electroluminescence (particularly organic electroluminescence) elements, a field emission type display device (FED) which uses field emission elements have been practically used or have been under studies for practical use thereof.

Particularly, in recent mobile phones, a display device having two screens consisting of a main screen and a sub screen thereon has been mainly mounted. In such a display device of the mobile phone, a display panel for the sub screen (a second display panel) is usually smaller in size than a display panel for the main screen (a first display panel). Further, these two display panels are mounted on the mobile phone as integral modules, wherein these display panels are accommodated into front and rear portions of a common holder. Such a holder is hereinafter referred to as a two-panel integral-type holder.

Figure 1A:
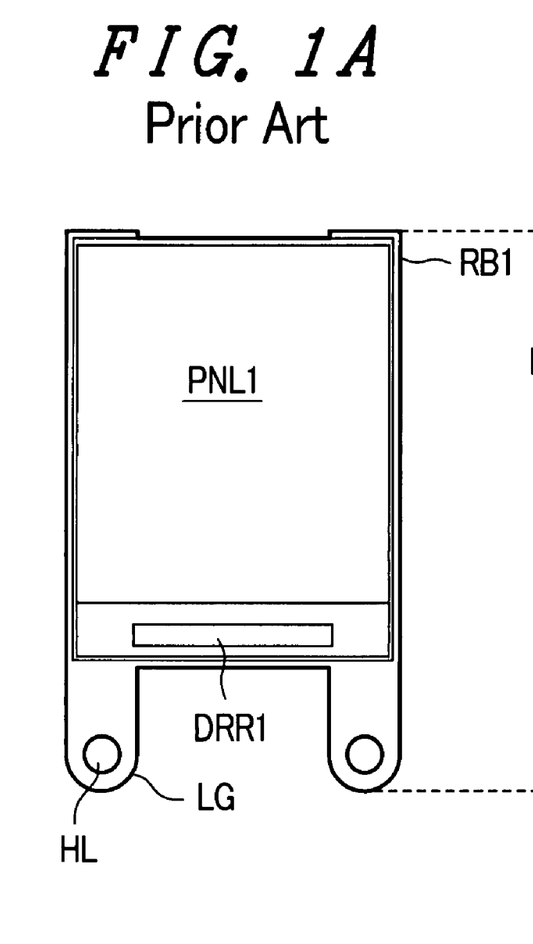
FIG. 1A to FIG. 1C are explanatory views of a constitutional example of a two-panel integral-type holder which is widely adopted by a mobile phone.
Figure 1B:
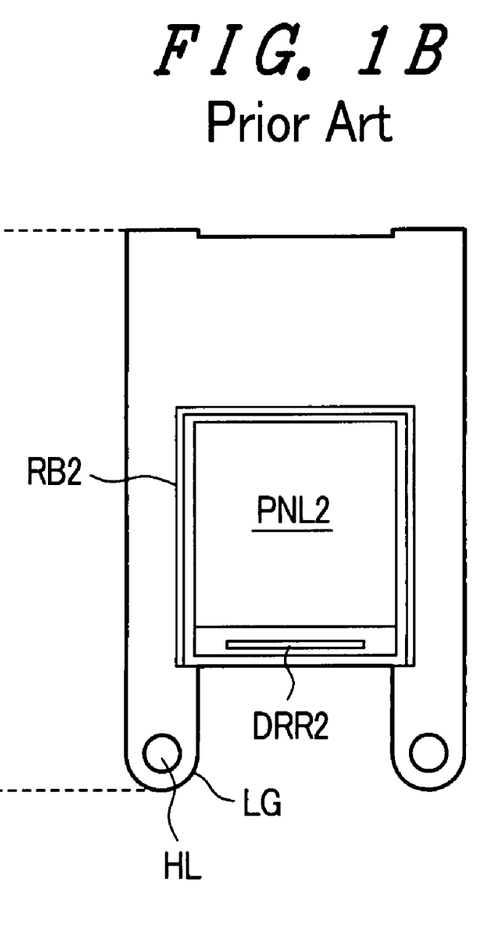
Figure 1C:
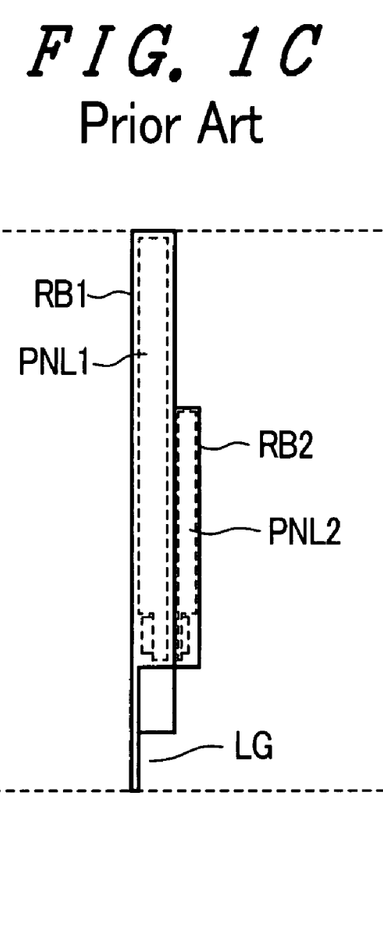

FIG. 1A to FIG. 1C are explanatory views showing a constitutional example of a two-panel integral-type holder which is popularly adopted by the mobile phones. Here, although the explanation will be made using a liquid crystal display panel as a display panel, the explanation is similarly applicable to the above-mentioned other display panels. FIG. 1A is a plan view of an accommodating surface (one surface) of the first display panel, FIG. 1B is a plan view of an accommodating surface (another surface) of the second display panel, and FIG. 1C is a side view. In this two-panel integral-type holder, a first bank-like rib RB1 which surrounds at least three sides of the periphery of the first display panel PNL1 and defines a first accommodating region is formed on a first panel accommodating surface shown in FIG. 1A. The first display panel PNL1 constitutes a display screen (screen region) by sealing liquid crystal between two glass substrates, and a drive circuit chip DRR1 for driving the first display panel is mounted on the outside of the display screen (lower side in FIG. 1A to FIG. 1C).

Further, a second bank-like rib RB2 which surrounds at least three sides of the periphery of the second display panel PNL2 and defines a second accommodating region is formed on a second panel accommodating surface shown in FIG. 1B. The second display panel PNL2 also constitutes a display screen (screen region) by sealing liquid crystal between two glass substrates, and a drive circuit chip DRR2 for driving the second display panel is mounted on the outside of the display screen (lower side in FIG. 1A to FIG. 1C). Here, in FIG. 1A to FIG. 1C, reference symbol LG indicates leg portions for mounting the two-panel integral-type holder to a body of the mobile phone using threaded holes HL. Here, in the mobile phone, it is necessary to provide a grounded conductive shield for blocking the electromagnetic wave interference (EMI) which is generated from two display panels accommodated in the inside of the casing, electronic components such as drivers, a printed circuit board, a flexible printed circuit board or the like. Accordingly, recently, display devices which will be explained hereinafter in conjunction with following FIG. 2A to FIG. 2D and FIG. 3A and FIG. 3B are used.

Figure 2A:
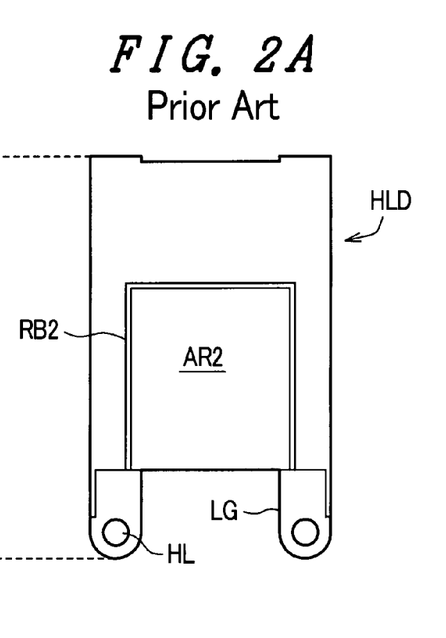
FIG. 2A to FIG. 2D are explanatory views of one example of the two-panel integral-type holder.
Figure 2B:
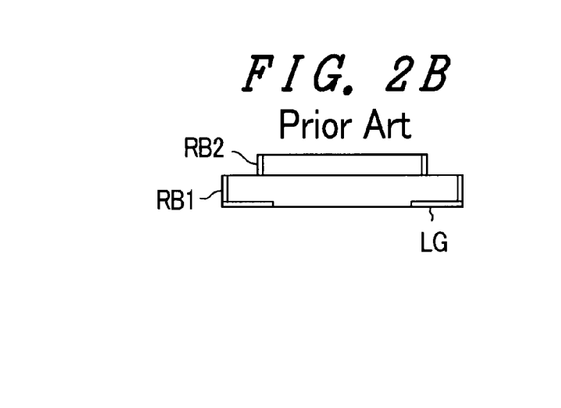
Figure 2C:
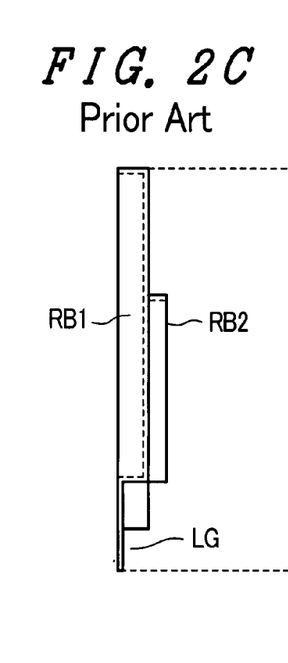
Figure 2D:
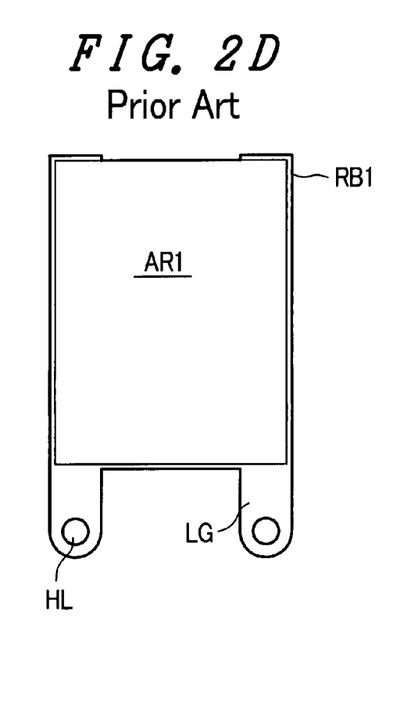

FIG. 2A to FIG. 2D are explanatory views of one example of the two-panel integral-type holder and, more specifically, explanatory views of a constitutional example of the two-panel integral-type holder which is molded by magnesium diecasting. FIG. 2A is a plan view of a second panel accommodating surface, FIG. 2B is a side view of a leg portion LG side, and FIG. 2C is also a side view. The second display panel PNL2 is accommodated in a second accommodating region AR2 which is defined by a second bank-like rib RB2 formed of bank-like ribs at three sides. Further, FIG. 2D is a plan view of the first panel accommodating surface. The first display panel PNL1 is accommodated in a first accommodating region AR1 which is defined by a first bank-like rib RB1 formed of bank-like ribs at three sides. Since the two-panel integral-type holder which is formed by magnesium diecasting per se has the conductivity, by grounding the two-panel integral-type holder, the holder can perform the EMI shielding function. However, the magnesium diecast product is expensive and this has been one of factors which hamper the reduction of the cost of the applied equipment such as the mobile phone. By manufacturing the two-panel integral-type holder using the resin mold explained hereinafter, it is possible to achieve the reduction of cost.

Figure 3A:
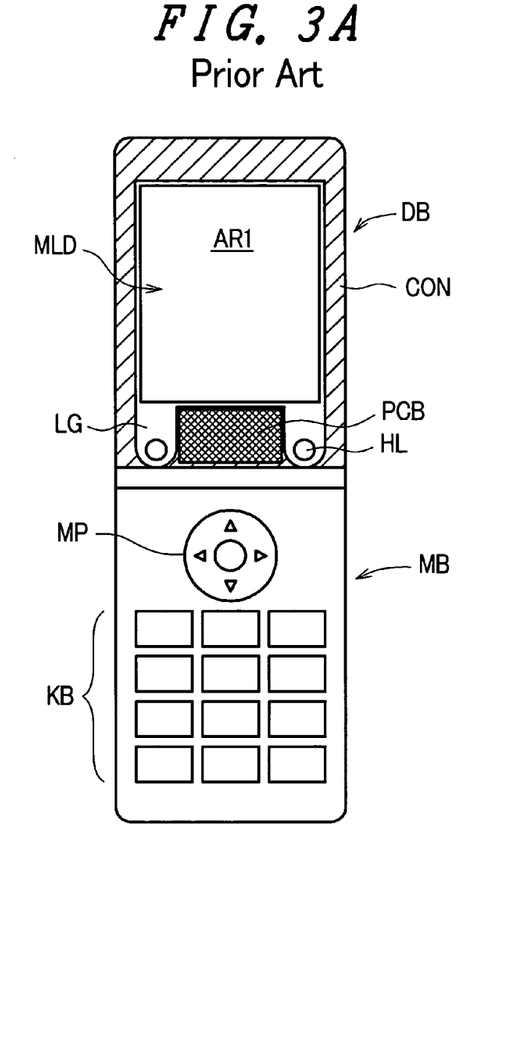
FIG. 3A to FIG. 3B are explanatory views of the structure of the mobile phone for explaining an example in which the two-panel integral-type holder is manufactured by resin molding.
Figure 3B:
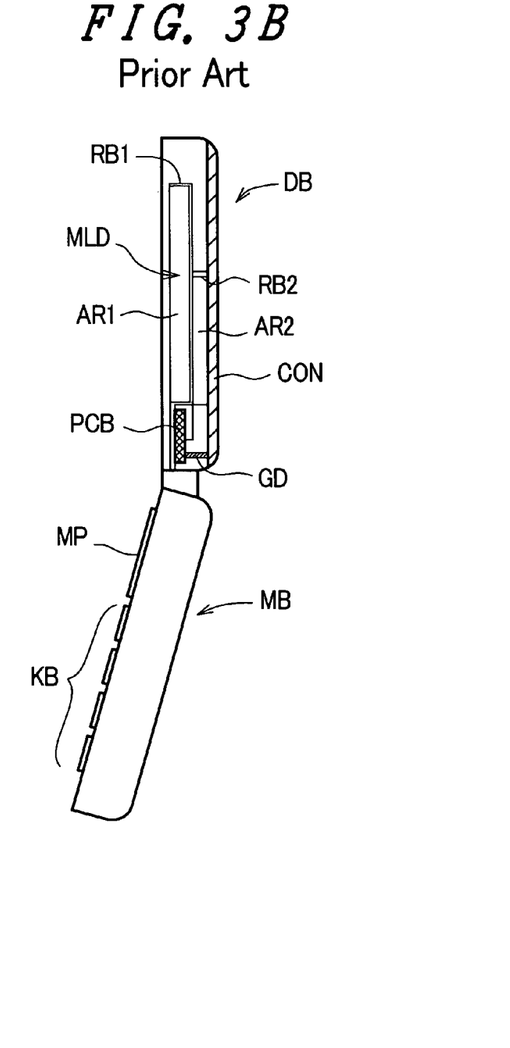

FIG. 3A to FIG. 3B are structural explanatory views of the mobile phone for explaining an example in which the two-panel integral-type holder is manufactured by resin molding. The mobile phone is of a foldable type and is constituted of body part casing MB and a display part casing DB. A transmission and reception circuit and a data processing circuit are incorporated in the body part casing MB, while a keyboard KB and functional manipulation buttons MP are mounted on a surface of the mobile phone. Although the first display panel and the second display panel are respectively accommodated in one surface (inner surface) and another surface (outer surface) of the display part casing DB, here, the first accommodating region AR1 and the second accommodating region AR2 are shown in a state that both display panels are not mounted. On a lower side of the first accommodating region AR1 (between two leg portions LG), a casing-side printed circuit board PCB which includes part which are not necessary for display is mounted.

The two-panel integral-type holder HLD has a whole body thereof formed of resin by molding (resin molding) MLD and the above-mentioned conductivity is imparted by forming a conductive layer CON on an inner surface of the mobile phone body (casing). Although the conductive layer CON which is mounted in the inside of the display part casing DB can be formed by plating, coating or any other suitable film forming method, plating is adopted here. The conductive layer CON is grounded by a printed circuit board PCB and a ground line GD at the casing side thus ensuring a shielding effect. Here, in the two-panel integral-type holder HLD, by bringing the bank-like rib RB2 which defines the second accommodating region into contact with the inner side of the display part casing DB, it is possible to support a load applied to the display part casing DB.

Here, as the literature which discloses the holder relevant to the display device of this type, Japanese Unexamined Patent Publication 2003-241170 is named, for example.

SUMMARY OF THE INVENTION

However, the two-panel integral-type holder HLD as explained in conjunction with FIG. 2A to FIG. 2D is formed by diecasting the magnesium metal material for making the holder light-weighted while ensuring the conductivity and the mechanical strength. Accordingly, as a whole, the two-panel integral-type holder has the conductivity. However, such a two-panel integral-type holder which is formed by diecasting a magnesium metal material pushes up the material cost and the manufacturing or forming cost. This has been one of factors to impede the reduction of cost of the mobile phone.

Further, with respect to the two-panel integral-type holder which is formed by resin molding explained in conjunction FIG. 3A and FIG. 3B, it is necessary to form the conductive layer CON on an inner surface of the phone body (casing). However, it is difficult for a manufacturing company of a display device to demand the treatment for imparting the conductivity to the casing side to an mobile phone assembling company. In other words, it is important that the display device per se has the shield structure. Further, it is necessary to expose the second display panel PNL2 from the casing and hence, the conductive layer CON cannot be formed on the portion whereby the shielding becomes insufficient.

Accordingly, an advantageous effect of the present invention lies in that a display device which is provided with a two-panel integral-type holder having the EMI shield structure can be manufactured at a low cost.

A display device of the present invention includes a two-panel integral-type holder which holds a first display panel on one surface thereof and holds a second display panel having a size smaller than a size of the first display panel on another surface thereof. The two-panel integral-type holder is a resin molded product (resin mold) and has a first bank-like rib which is formed on one surface and surrounds at least three sides of a periphery of the first display panel thus defining a first accommodating region and a second bank-like rib which is formed on another surface and surrounds at least three sides of a periphery of the second display panel thus defining a second accommodating region.

Further, a conductive sheet member is formed on a first portion of another surface corresponding to the first accommodating region except for the second accommodating region and a second portion of another surface corresponding to the second accommodating region respectively, wherein the conductive sheet member is brought into contact with another surface. A notch is formed in a portion of the second bank-like rib, and the first portion and the second portion of the conductive sheet member are electrically connected with each other through the notch.

Further, the present invention may be also configured such that the second bank-like rib is constituted of three bank-like portions which correspond to three sides of the second display panel and the notch is formed in the center bank-like portion of the second bank-like rib.

Further, the present invention may be also configured such that an auxiliary bank-like rib is formed in the first portion arranged close to the notch, and an opening which exposes the auxiliary bank-like rib is formed in the conductive sheet member.

Further, the present invention may be also configured such that the notch is formed in at least one of two opposing bank-like portions of the second bank-like rib.

Further, the present invention may be also configured such that the notch is formed in end portions of two opposing bank-like portions of the second bank-like rib.

Further, the present invention may be also configured such that the first portion and the second portion of the conductive sheet member are connected with each other at two or more positions.

Further, the present invention may be also configured such that the conductive sheet member has a folded portion which is folded to a side surface of the two-panel integral-type holder, and the first portion and the second portion of the conductive sheet member are electrically connected with each other at the folded portion.

Further, the present invention may be also configured such that between the first portion and the second portion of the conductive sheet member, a bridge which gets over a portion of the second bank-like rib and electrically connects the first portion and the second portion of the conductive sheet member is provided.

Further, the present invention may be also configured such that another surface of the resin molded part has an inclined surface where the second portion is inclined with respect to the first portion, and the conductive sheet member includes blank-out openings which absorb the deformation of the conductive sheet member when the conductive sheet member is applied to the inclined surface.

Further, the present invention may be also configured such that another surface of the resin molded part has a stepped portion between the first portion and the second portion, and the conductive sheet member includes blank-out openings which absorb the deformation of the conductive sheet member when the conductive sheet member is applied to the stepped portion.

According to the present invention, it is possible to obtain the display device provided with the two-panel integral-type holder having the EMI shielding structure at a low cost.

Here, the constitution of the present invention is not limited to the above-mentioned constitutions and the constitutions of embodiments described later and various modifications can be made without departing from the technical concept of the present invention.

DESCRIPTION OF THE PREFERRED EMBODIMENTS

Preferred embodiments of a display device of the present invention are explained in detail in conjunction with drawings which show embodiments. Here, in the embodiments described hereinafter, the explanation will be made with respect to an example in which a liquid crystal display device is used as a display device. However, it is needless to say that the present invention is also applicable to other cases in which an organic EL display device, a FED or the like are used as the display device.

Embodiment 1

Figure 4A:
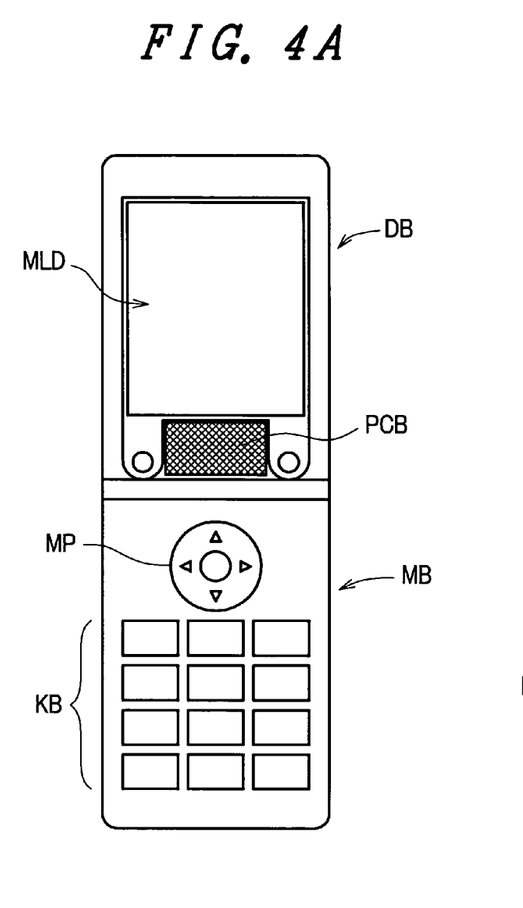
FIG. 4A to FIG. 4B are structural views of a mobile phone for explaining the embodiment 1 of the present invention.
Figure 4B:
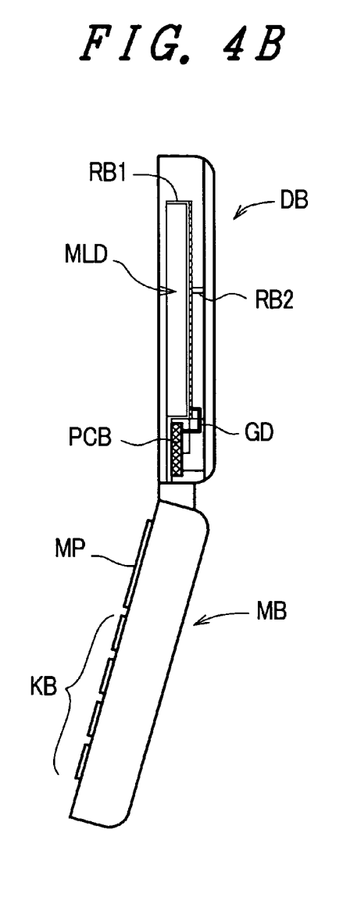

FIG. 4A to FIG. 4B are structural views of a mobile phone for explaining an embodiment 1 of the present invention. In the same manner as the mobile phone shown in FIG. 3A to FIG. 3B, the mobile phone is of a foldable type which is constituted of a body part casing MB and a display part casing DB. A transmission and reception circuit and a data processing circuit are incorporated in the body part casing MB and a keyboard KB and function manipulation buttons MP are mounted on a surface of the body part casing MB. A two-panel integral-type holder HLD is mounted in the display part casing DB. A first display panel and a second display panel are accommodated into one surface (inner surface=front surface side) and another surface (outer surface=back surface side) of the two-panel integral-type holder HLD respectively. FIG. 4A to FIG. 4B show a first accommodating region AR1 and a second accommodating region AR2 in a state in which both display panels are not mounted on the two-panel integral-type holder HLD. A printed circuit board PCB is mounted on a lower side of the first accommodating region AR1 (between two leg portions LG).

The two-panel integral-type holder HLD is constituted by combining a resin mold MLD and a conductive sheet MTS. As explained later in conjunction with FIG. 5, the conductive sheet MTS is mounted on a back surface (another surface) opposite to a front surface (one surface) which constitutes a first-display-panel-accommodating-region side of the resin mold MLD. In this embodiment, the printed circuit board PCB at the casing side is connected with the conductive sheet MTS by way of a ground line GD. Due to such a constitution, the conductive sheet MTS is grounded and functions as an EMI shielding. Accordingly, different from the mobile phone shown in FIG. 3A to FIG. 3B, it is no more necessary to mount the conductive layer CON on the inner surface of the mobile phone body. Since other constitutions are substantially equal to the constitution shown in FIG. 3A to FIG. 3B, their repeated explanation is omitted.

Figure 5:
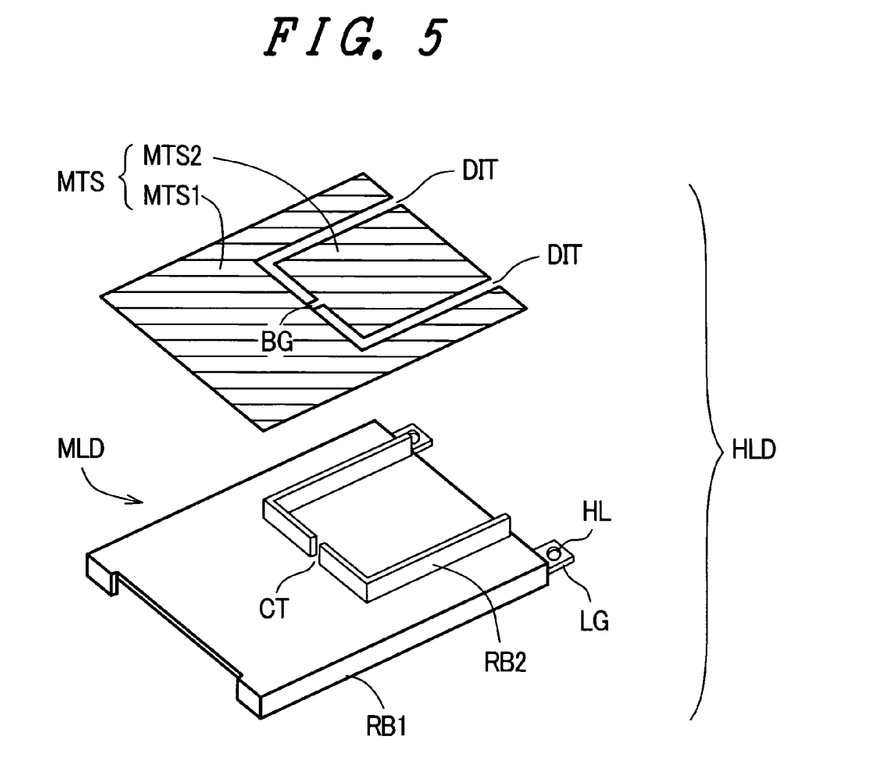
FIG. 5 is a perspective view for explaining a structural example of the two-panel integral-type holder and a conductive sheet in FIG. 4A to FIG. 4B.

FIG. 5 is a perspective view for explaining a structural example of the two-panel integral-type holder HLD and the conductive sheet MTS shown in FIG. 4A to FIG. 4B. In FIG. 5, the two-panel integral-type holder HLD is arranged such with a front surface thereof facing down and a back surface thereof facing up. A first bank-like rib RB1 is formed on a periphery of the front surface, that is, the first-display-panel-accommodating side of the two-panel integral-type holder HLD. The first bank-like rib RB1 is, in this embodiment, formed on the whole region of two opposing sides arranged close to sides where the leg portions LG are formed and corner portions arranged close to the above-mentioned two opposing sides on the sides opposite to the sides where the leg portions LG are formed. A notched portion formed in the first bank-like rib RB1 on the side opposite to the side where the leg portion LG is formed corresponds to a pull-out portion of the flexible printed circuit board which is connected with the first display panel. Here, depending on the mounting mode of the flexible printed circuit board, the first bank-like rib RB1 may be formed on all these sides.

A second bank-like rib RB2 is formed on the back surface of the two-panel integral-type holder HLD, that is, on a periphery thereof at the second-display-pane-accommodating side. The second bank-like rib RB2 is formed on the whole region of two opposing sided arranged close to the sides where the leg portions LG are formed and on the side opposite to the side where the leg portion LG is formed such that the second bank-like rib RB2 forms an approximately U shape. Further, a notch CT is formed in a center portion of the side opposite to the side where the leg portion LG is formed.

The conductive sheet MTS is formed of a metal thin sheet preferably made of aluminum, stainless steel or the like and a cut-out portion DIT is formed in a portion thereof which corresponds to the second bank-like rib RB2 which defines a second display panel accommodating region of the two-panel integral-type holder HLD. On the surface (another surface) of the resin mold MLD on which the second bank-like rib RB2 is formed is divided into a second portion which constitutes an accommodating region for the second display panel surrounded by the second bank-like rib RB2 and a first portion which constitute other remaining portion. The conductive sheet MTS is constituted of a first conductive sheet portion MTS1 which is positioned at the first portion and a second conductive sheet portion MTS2 which is positioned at the second portion. The cut-out portion DIT is separated by a connecting portion (bridge) BG which connects the first conductive sheet portion MTS1 and the second conductive sheet portion MTS2 through the notch CT formed in the second bank-like rib RB2 of the two-panel integral-type holder HLD. That is, the first conductive sheet portion MTS1 and the second conductive sheet portion MTS2 are electrically communicated with each other via the bridge BG. Due to such a constitution, it is possible to obviate a situation in which either one of the first conductive sheet portion MTS1 and the second conductive sheet portion MTS2 assumes a floating state.

Here, the formation of the conductive sheet MTS into such a shape can be easily performed by punching or blanking. Further, since the conductive sheet MTS constitutes an integral body, the handling of the conductive sheet MTS and the assembling of the conductive sheet MTS on the resin mold MLD is facilitated.

Figure 6A:
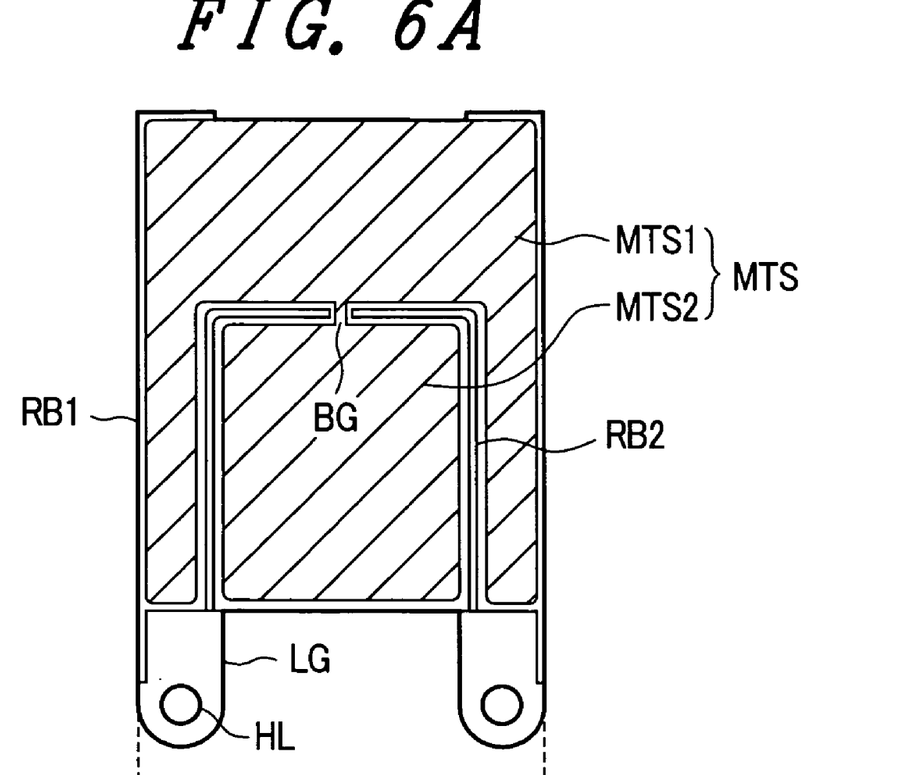
FIG. 6A to FIG. 6B are explanatory views of a state in which the two-panel integral-type holder and a conductive sheet in FIG. 5 are integrally formed by combination.
Figure 6B:
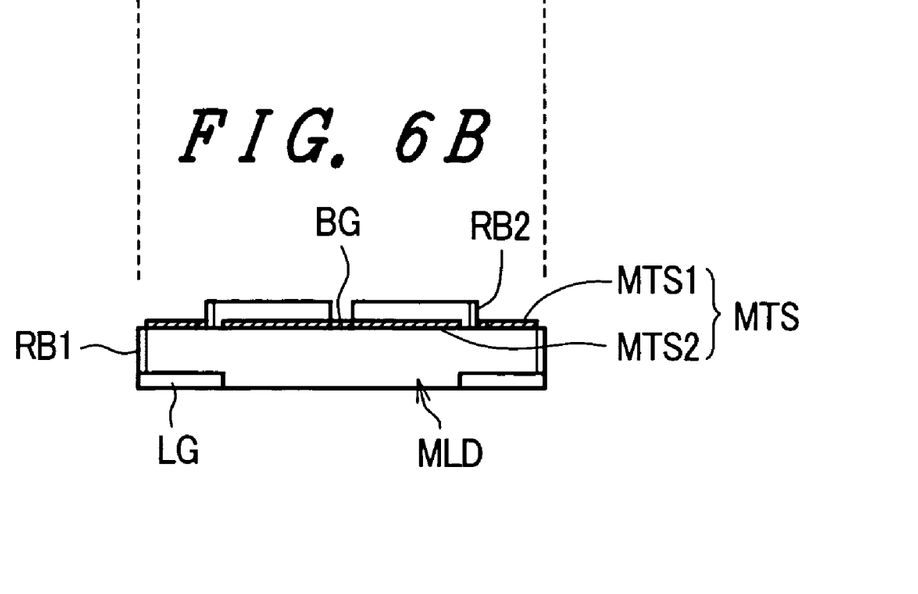

FIG. 6A to FIG. 6B are explanatory views of a state in which the two-panel integral-type holder HLD and the conductive sheet MTS in FIG. 5 are integrally formed by combination, wherein FIG. 6A is a plan view as viewed from an accommodating region side of the second display panel and FIG. 6B is a side view as viewed from the leg portion LG in FIG. 6A. As shown in FIG. 6A to FIG. 6B, the conductive sheet MTS is laminated to the resin mold MLD such that the first conductive sheet portion MTS1 thereof is positioned outside the second bank-like rib RB2 and the second conductive sheet portion MTS2 thereof is positioned inside the second bank-like rib RB2. The lamination implies the situation in which both parts are merely brought into contact with each other, they may be fixed to each other using an adhesive agent or the like when necessary.

As can be clearly understood from FIG. 6A to FIG. 6B, the first conductive sheet portion MTS1 and the second conductive sheet portion MTS2 are electrically connected with each other using the bridge BG thus making both sheet portions have the same potential. Accordingly, by grounding either one portion of the conductive sheet MTS, it is possible to impart the EMI shield effect to the whole conductive sheet MTS. As a grounding method, in this embodiment, the printed circuit board PCB at the casing side and the first conductive sheet portion MTS1 are connected with each other by way of a ground line GD. However, the grounding method is not limited to the above-mentioned method and the grounding may be performed by making use of the display panel or the flexible printed circuit board.

In this manner, according to this embodiment, by mounting the conductive sheet MTS on the two-panel integral-type holder HLD, it is possible to impart the function of the EMI shielding to the two-panel integral-type holder HLD at a low cost and, at the same time, it is no more necessary to perform the conductivity imparting operation to the casing side which is explained previously in conjunction with FIG. 3 at the mobile-phone assembling and manufacturing factory. Here, although it is possible to impart the conductivity to the resin mold MLD by performing the treatment such as plating without using the conductive sheet MTS, the two-panel integral-type holder HLD can be manufactured at a lower cost with the use of the conductive sheet MTS.

Here, it is possible to suitably change the shape of the second bank-like rib RB2, the position and the number of the notches CT formed in the second bank-like rib RB2, the shape of the conductive sheet MTS, and the position and the number of the bridges BG.

Embodiment 2

Figure 7A:
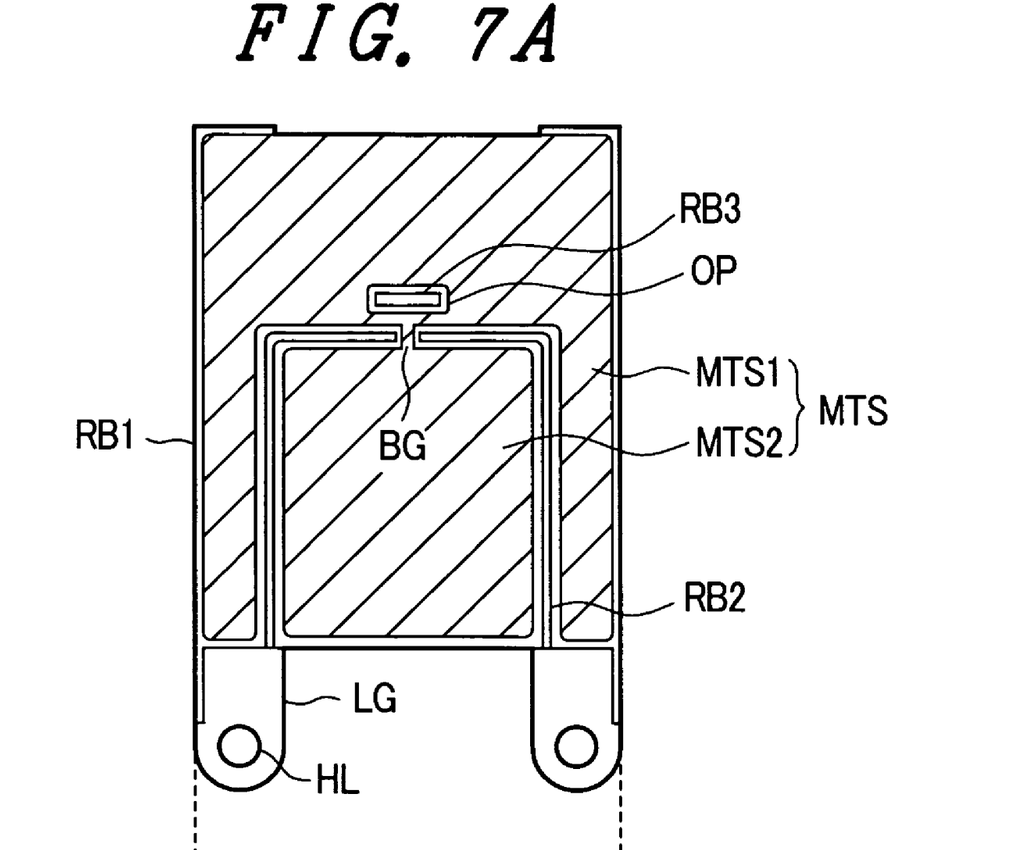
FIG. 7A to FIG. 7B are explanatory views for explaining the embodiment 2 of the present invention and show a state in which the two-panel integral-type holder and a conductive sheet similar to FIG. 6A to FIG. 6B are integrally formed by combination.
Figure 7B:
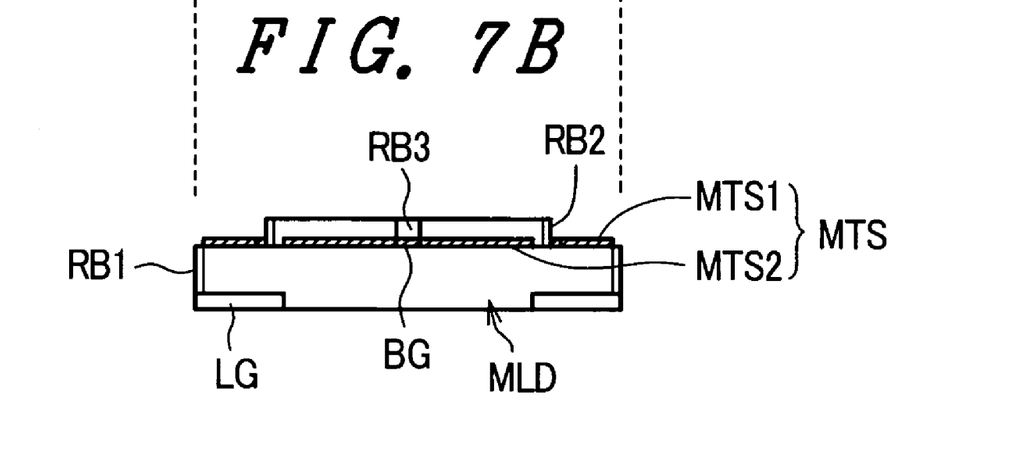

FIG. 7A to FIG. 7B are explanatory views for explaining the embodiment 2 of the present invention and show a state in which the two-panel integral-type holder HLD and a conductive sheet MTS similar to FIG. 6A to FIG. 6B are integrally formed by combination, wherein FIG. 7A is a plan view as viewed from an accommodating region side of the second display panel and FIG. 7B is a side view as viewed from the leg portion LG side in FIG. 7A. In the embodiment shown in FIG. 6A to FIG. 6B, since the notch is formed in the portion of the second bank-like rib RB2, the mechanical strength that the second bank-like rib RB2 possesses due to the structure that the second bank-like rib RB2 is brought into contact with the display part DB of the mobile phone explained in conjunction with FIG. 4B is lowered. In this embodiment, to compensate for such lowering of the mechanical strength, on the side of the two-panel integral-type holder HLD where the first conductive sheet portion MTS1 is mounted, a third rib RB3 is formed in the vicinity of the notch and an opening OP is formed in the conductive sheet MTS at a position corresponding to the third rib RB3.

Embodiment 3

Figure 8A:
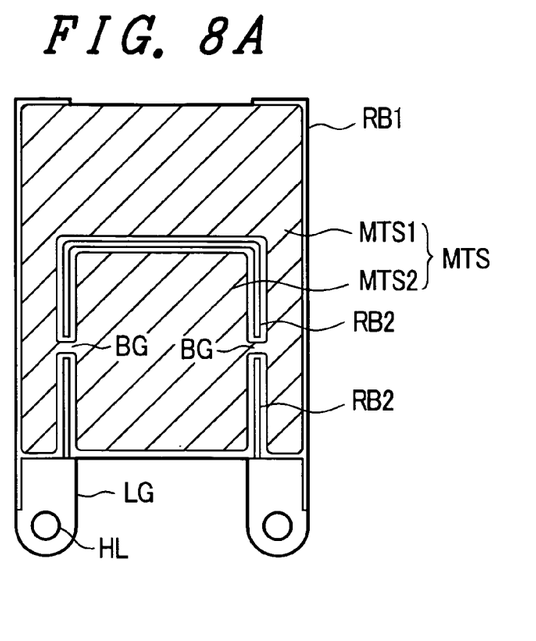
FIG. 8A to FIG. 8B are explanatory views for explaining the embodiment 3 of the present invention and show a state in which the two-panel integral-type holder and a conductive sheet are integrally formed by combination.
Figure 8B:
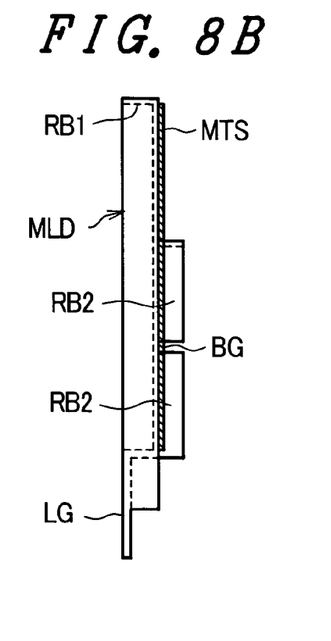

FIG. 8A to FIG. 8B are explanatory views for explaining the embodiment 3 of the present invention and show a state in which the two-panel integral-type holder HLD and the conductive sheet MTS are integrally formed by combination, wherein FIG. 8A is a plan view as viewed from an accommodating region side of the second display panel and FIG. 8B is a side view as viewed from a side close to the side on which the leg portion LG is formed in FIG. 8A. In this embodiment, the notches which are formed in the second bank-like rib RB2 shown in FIG. 6A to FIG. 6B are formed in two opposing sides of the second bank-like rib RB2 respectively. Accordingly, the first conductive sheet portion MTS1 and the second conductive sheet portion MTS2 are formed on the two-panel integral-type holder MLD in a state that the first conductive sheet portion MTS1 and the second conductive sheet portion MTS2 are connected by bridges BG which pass the notches formed in two portions Qf the second bank-like rib RB2.

According to this embodiment, since the first conductive sheet portion MTS1 and the second conductive sheet portion MTS2 are connected at two portions, these sheet portions are hardly separated from each other and the number of the occurrence of defective products in the assembling step can be decreased and, at the same time, the handling of the conductive sheet MTS is also facilitated.

Embodiment 4

Figure 9:
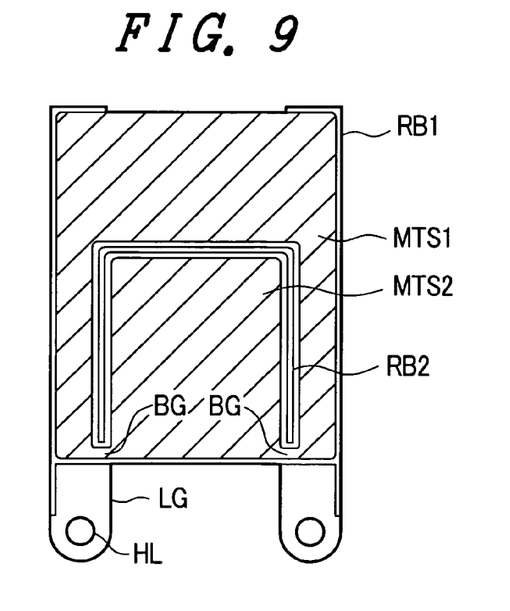
FIG. 9 is a plan view for explaining the embodiment 4 of the present invention as viewed from an accommodating region side of the second display panel and shows a state in which the two-panel integral-type holder and a conductive sheet are integrally formed by combination.

FIG. 9 is an explanatory plan view for explaining the embodiment 4 of the present invention as viewed from an accommodating region side of the second display panel and shows a state in which the two-panel integral-type holder HLD and the conductive sheet MTS are integrally formed by combination. In this embodiment, the notches which are formed in the second bank-like rib RB2 for defining the second display panel accommodating region AR2 are formed on end portions of two opposing bank-like portions of the second bank-like rib RB2. In other words, the notches are formed by shortening the terminal ends of two opposing sides than the size of the corresponding opposing sides in the above-mentioned respective embodiments. The first conductive sheet portion MTS1 and the second conductive sheet portion MTS2 are connected with each other by bridges BG which pass the respective end portions of these two sides.

According to this embodiment, in the same manner as the embodiment shown in FIG. 8A to FIG. 8B, since the first conductive sheet portion MTS1 and the second conductive sheet portion MTS2 are connected at two portions, these sheet portions are hardly separated from each other and the number of the occurrence of defective products can be decreased in the assembling step and, at the same time, the handling of the conductive sheet MTS is also facilitated. Further, since there is no notches in the midst of the second bank-like rib RB2 and hence, it is possible to suppress the lowering of the mechanical strength. Here, it is also possible to shorten only one end portion out of two opposing sides of the second bank-like rib RB2 thus forming one notch.

Embodiment 5

Figure 10A:
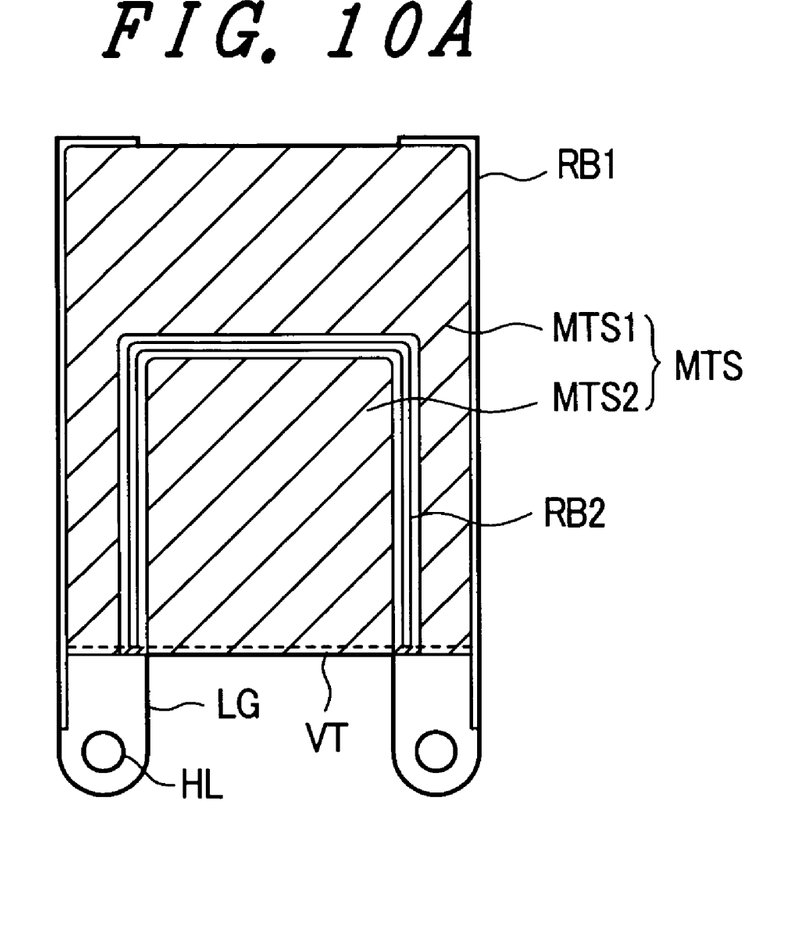
FIG. 10A to FIG. 10B are explanatory views for explaining the embodiment 5 of the present invention and show a state in which the two-panel integral-type holder and a conductive sheet are integrally formed by combination.
Figure 10B:
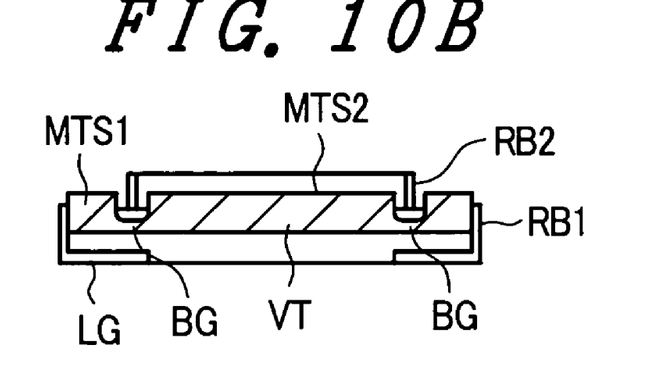

FIG. 10A to FIG. 10B are explanatory views for explaining the embodiment 5 of the present invention and show a state in which the two-panel integral-type holder and a conductive sheet MTS are integrally formed by combination, wherein FIG. 10A is a plan view as viewed from an accommodating region side of the second display panel and FIG. 10B is a side view as viewed from a side close to the leg portion LG in FIG. 10A. In the embodiment shown in FIG. 10A to FIG. 10B, no notch is formed in the second bank-like rib RB2 and, in place of the notch, to expose the second bank-like rib RB2, the length of the end portion of the cutout portion DIT formed in the conductive sheet MTS is slightly elongated to form a bridge BG and, thereafter, a leg-portion-LG side is folded and is arranged along the side surface of the two-panel integral-type holder HLD at the leg portion LG side whereby the bridge BG connects the first conductive sheet portion MTS1 and the second conductive sheet portion MTS2.

According to this embodiment, since the first conductive sheet portion MTS1 and the second conductive sheet portion MTS2 are connected at two portions of the side surfaces of the two-panel integral-type holder, these sheet portions are hardly separated from each other and the number of the occurrence of defective products in the assembling step can be decreased and, at the same time, the handling of the conductive sheet MTS is also facilitated. Further, since there is no notches in the midst of the second bank-like rib RB2 and hence, it is possible to suppress the lowering of the mechanical strength.

Embodiment 6

Figure 11A:
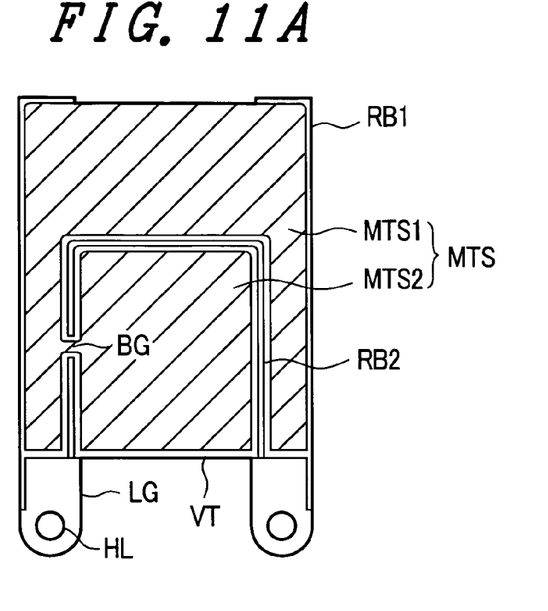
FIG. 11A to FIG. 11C are explanatory views for explaining the embodiment 6 of the present invention and show a state in which the two-panel integral-type holder and a conductive sheet are integrally formed by combination.
Figure 11B:
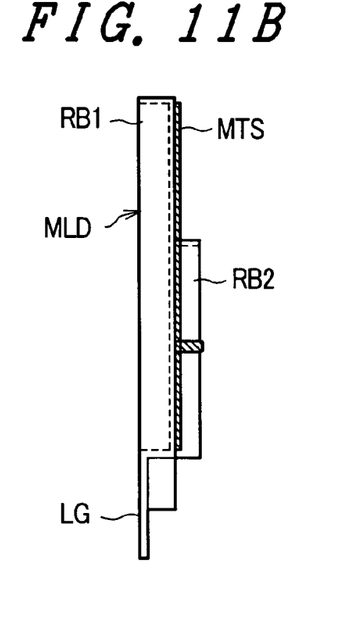
Figure 11C:
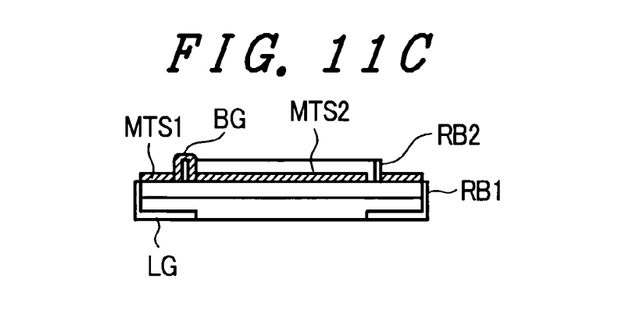

FIG. 1A to FIG. 11C are explanatory views for explaining the embodiment 6 of the present invention and show a state in which the two-panel integral-type holder and a conductive sheet MTS are integrally formed by combination, wherein FIG. 11A is a plan view as viewed from an accommodating region side of the second display panel and FIG. 11B is a side view as viewed from a side close to the side on which the leg portion LG is formed in FIG. 11A, and FIG. 11C is a side view as viewed from the side on which the leg portion LG is formed in FIG. 11A. In the embodiment shown in FIG. 11A to FIG. 11B, between the first portion MTS1 and the second portion MTS2 of the conductive sheet member MTS, a bridge BG which connects first conductive sheet portion MTS1 and the second conductive sheet portion MTS2 is formed such that the bridge BC gets over the second bank-like rib RB2 which defines the second display panel accommodating region. Accordingly, at the time of assembling the conductive sheet MTS into the two-panel integral-type holder HLD, a slight elongation of the bridge BG occurs. Accordingly, as a material of the conductive sheet MTS of this embodiment, a metal thin film which is strong against the elongation is used. Further, a height of a portion of the second bank-like rib RB2 where the bridge BG gets over may be lowered by an amount corresponding to a thickness of the conductive sheet MTS. Here, the bridges BG may be positioned at two opposing sides which constitute the second bank-like rib RB2. The position and the number of the bridges BG may be suitably changed. However, when the wiring exists in the vicinity of the cut-out section of the substrate which constitutes the second display panel PNL2, it is preferable to provide the bridge BG at a position remote from the wiring to prevent the contact therebetween.

According to this embodiment, since no notch is formed in the second bank-like rib RB2, it is possible to suppress the lowering of the mechanical strength of the two-panel integral-type holder HLD.

Embodiment 7

Figure 12:
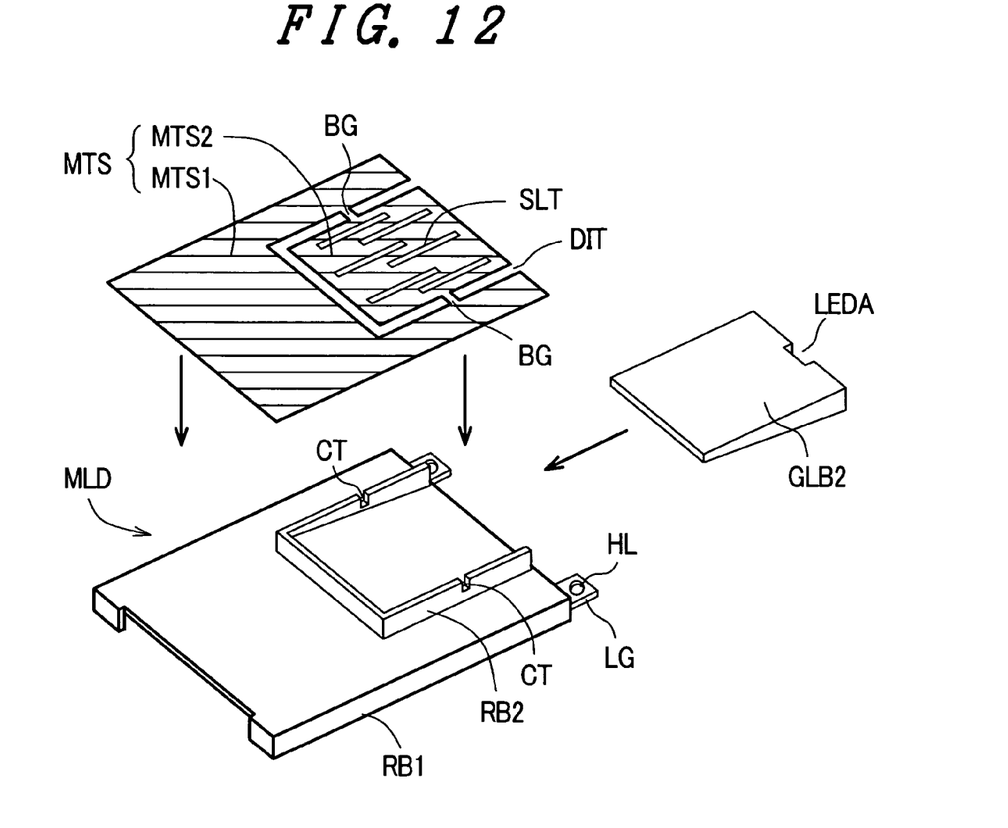
FIG. 12 is a perspective view showing the two-panel integral-type holder, the conductive sheet and a light guide plate in a developed form for explaining the embodiment 7 of the present invention.

FIG. 12 is a perspective view showing the two-panel integral-type holder, the conductive sheet MTS and a light guide plate in a developed form for explaining the embodiment 7 of the present invention. This embodiment is, based on the constitution of the embodiment explained in conjunction with FIG. 8A to FIG. 8B, characterized in that the light guide plate which is mounted on the back surface of the second display panel has a wedge-like cross section. When the light guide plate GLB2 having the wedge-like cross section is mounted on the back surface (two-panel integral-type holder HLD side) of the second display panel, an inclination which corresponds to an inclined back surface of the light guide plate GLB2 is given to a second display panel accommodating surface of the two-panel integral-type holder HLD. In mounting the conductive sheet MTS along the accommodating surface to which the inclination is imparted, a deformation force is applied to the second conductive sheet portion MTS2 of the conductive sheet MTS and hence, there exists a possibility that the bridge BG ruptures. In this embodiment, by forming slits SLT (also referred to as "blank-out openings") in the second conductive sheet portion MTS2, the above-mentioned deformation force can be absorbed so that the rupture of the bridge BG can be obviated. Here, the slits SLT may be formed in the vicinity of the notches CT formed at the first conductive sheet portion MTS1 side.

The surface (another surface) on the side on which the second bank-like rib RB2 of the resin mold MLD is formed is divided into a second portion which constitutes the second display panel accommodating portion surrounded by the second bank-like rib RB2 and a first portion which is constituted by other remaining portion. The present invention is applicable to a case in which the second portion is inclined with respect to the first portion on another surface of the resin mold MLD. Accordingly, when the light guide plate GLB1 having a wedge-like cross section is mounted on the first display panel accommodating surface of the two-panel integral-type holder HLD and also when the light guide plates GLB1, GLB2 having a wedge-like cross section are mounted on both of the first display panel accommodating surface and the second display panel accommodating surface of the two-panel integral-type holder HLD, the similar constitution may be adopted. Here, the shape of the slits SLT is not limited to the illustrated shape and the slits SLT may be formed in a circular shape, an elliptical shape, a single cut shape or the like. Further, the slit SLT may be formed in a shape which does not allow the slit SLT to reach the end portion as shown in the drawing or may be formed in a shape which allows the slit SLT to reach the end portion although not shown in the drawing.

Here, the present invention is not limited to the case in which the present invention is applied to the inclined surface and is also applicable to a case in which a stepped portion is formed between the first portion and the second portion. In this case, the slits (blank-out openings) absorb the influence attributed to the stepped portion. In this case, the presence of the inclined surface is not the prerequisite. Further, the provision of the light guide plate having the wedge-like cross section is not also the prerequisite.

Figure 13:
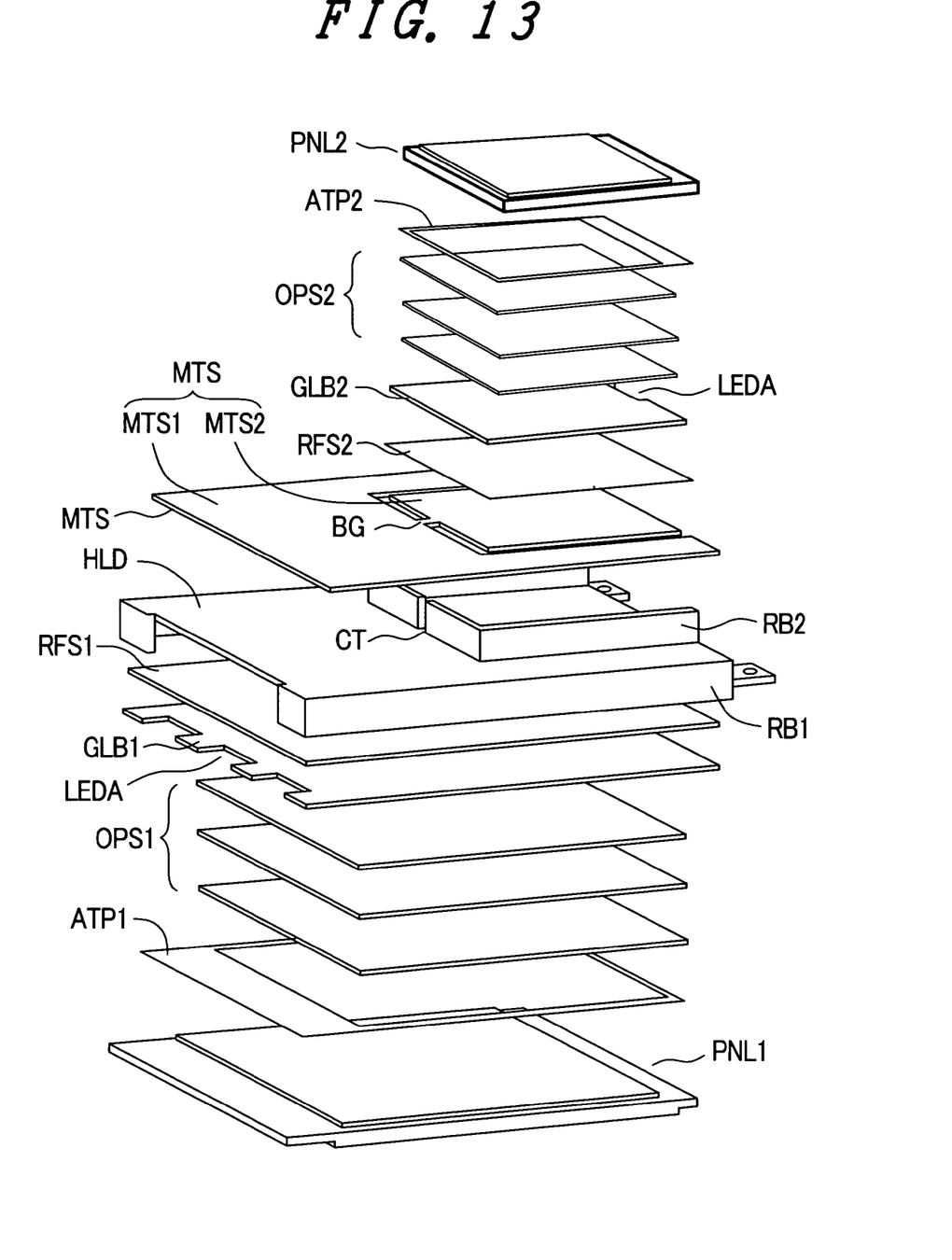
FIG. 13 is a developed perspective view for explaining one example of a liquid crystal display device using the two-panel integral-type holder in the present invention.

FIG. 13 is a developed perspective view for explaining one example of a liquid crystal display device using the two-panel integral-type holder in the present invention. In the drawing, it is assumed that the liquid crystal display device uses the two-panel integral-type holder HLD and the conductive sheet MTS of the first embodiment of the present invention. The explanation is made with respect to the case that the first display panel PNL1 which constitutes the main screen is placed on the lower side and the second display panel PNL2 which constitutes the sub screen having a size smaller than a size of the first display panel is placed on the upper side. Further, in this embodiment, both of the first display panel PNL1 and the second display panel PNL2 are formed of a liquid crystal panel.

In FIG. 13, in the inside of the first bank-like rib RB1 which defines the first accommodating region of the two-panel integral-type holder HLD, a first reflection sheet RFS1, a first light guide plate GLB1, and a first optical compensation sheet OPS1 are sequentially stacked and the first display panel PNL1 is accommodated above the stacked body using a first adhesive tape ATP1. Further, in the inside of the second bank-like rib RB2 which defines the second accommodating region, a conductive sheet MTS, a second reflection sheet RFS2, a second light guide plate GLB2, and a second optical compensation sheet OPS2 are sequentially stacked and the second display panel PNL2 is accommodated above the stacked body using a second adhesive tape ATP2.

Each one of the first optical compensation sheet OPS1 and the second optical compensation sheet OPS2 is constituted by stacking one or a plurality of optical diffusion sheets and one or a plurality of prism sheets. Further, in each one of the first light guide plate GLB1 and the second light guide plate GLB2, a recessed portion LEDA in which light emitting diodes which constitute a light source are accommodated is formed. Although there may be a case that a flexible printed circuit board which connects the first display panel PNL1 and the second display panel PNL2 is provided besides the above-mentioned constitution, the illustration of the flexible printed circuit board is omitted. Drive circuits which are used for driving the respective display panels may be provided to the respective display panels or the drive circuit may be used in common by two display panels.

The display device of the present invention which has been explained heretofore is not limited to the liquid crystal display device and is also applicable to the display device which uses other display panel such as the organic EL display device, the FED display device or the like. Here, in this specification, the term "two-panel integral-type holder" includes the holder which integrally holds three or more display panels. Also in this case, at least two display panels are integrally held and the present invention can be applied. Further, the respective embodiments described heretofore may be combined in two or more provided that no contradiction or discrepancy arises.

What is claimed is:

1. A display device having a two-panel integral-type holder which holds a first display panel on one surface thereof and holds a second display panel having a size smaller than a size of the first display panel on another surface thereof, wherein the two-panel integral-type holder is a resin molded product having a first bank-like rib which is formed on one surface and surrounds at least three sides of a periphery of the first display panel thus defining a first accommodating region and a second bank-like rib which is formed on another surface and surrounds at least three sides of a periphery of the second display panel thus defining a second accommodating region, a conductive sheet member is formed on a first portion of another surface corresponding to the first accommodating region except for the second accommodating region and a second portion of another surface corresponding to the second accommodating region respectively, the conductive sheet member being brought into contact with another surface, and a notch is formed in a portion of the second bank-like rib, and the first portion and the second portion of the conductive sheet member are electrically connected with each other through the notch.

2. A display device according to claim 1, wherein the second bank-like rib is constituted of three bank-like portions which correspond to three sides of the second display panel and the notch is formed in the center bank-like portion of the second bank-like rib.

3. A display device according to claim 2, wherein an auxiliary bank-like rib is formed in the first portion arranged close to the notch, and an opening which exposes the auxiliary bank-like rib is formed in the conductive sheet member.

4. A display device according to claim 1, wherein the second bank-like rib is constituted of three bank-like portions which correspond to three sides of the second display panel and the notch is formed in at least one of two opposing bank-like portions of the second bank-like rib.

5. A display device according to claim 1, wherein the second bank-like rib is constituted of three bank-like portions which correspond to three sides of the second display panel and the notch is formed in end portions of two opposing bank-like portions of the second bank-like rib.

6. A display device according to claim 1, wherein the first portion and the second portion of the conductive sheet member are connected with each other at two or more positions.

7. A display device having a two-panel integral-type holder which holds a first display panel on one surface thereof and holds a second display panel having a size smaller than a size of the first display panel on another surface thereof, wherein the two-panel integral-type holder is a resin molded product having a first bank-like rib which is formed on one surface and surrounds at least three sides of a periphery of the first display panel thus defining a first accommodating region and a second bank-like rib which is formed on another surface and surrounds at least three sides of a periphery of the second display panel thus defining a second accommodating region, a conductive sheet member is formed on a first portion of another surface corresponding to the first accommodating region except for the second accommodating region and a second portion of another surface corresponding to the second accommodating region respectively, the conductive sheet member being brought into contact with another surface, and the second bank-like rib is constituted of three bank-like portions corresponding to three sides of the second display panel, the conductive sheet member has a folded portion which is folded to a side surface of the two-panel integral-type holder, and the first portion and the second portion of the conductive sheet member are electrically connected with each other at the folded portion.

8. A display device having a two-panel integral-type holder which holds a first display panel on one surface thereof and holds a second display panel having a size smaller than a size of the first display panel on another surface thereof, wherein the two-panel integral-type holder is a resin molded product having a first bank-like rib which is formed on one surface and surrounds at least three sides of a periphery of the first display panel thus defining a first accommodating region and a second bank-like rib which is formed on another surface and surrounds at least three sides of a periphery of the second display panel thus defining a second accommodating region, a conductive sheet member is formed on a first portion of another surface corresponding to the first accommodating region except for the second accommodating region and a second portion of another surface corresponding to the second accommodating region respectively, the conductive sheet member being brought into contact with another surface, and between the first portion and the second portion of the conductive sheet member, a bridge which gets over a portion of the second bank-like rib and electrically connects the first portion and the second portion of the conductive sheet member is provided.

9. A display device having a two-panel integral-type holder which holds a first display panel on one surface thereof and holds a second display panel having a size smaller than a size of the first display panel on another surface thereof, wherein the two-panel integral-type holder is a resin molded product having a first bank-like rib which is formed on one surface and surrounds at least three sides of a periphery of the first display panel thus defining a first accommodating region and a second bank-like rib which is formed on another surface and surrounds at least three sides of a periphery of the second display panel thus defining a second accommodating region, a conductive sheet member is formed on a first portion of another surface corresponding to the first accommodating region except for the second accommodating region and a second portion of another surface corresponding to the second accommodating region respectively, the conductive sheet member being brought into contact with another surface, and a notch is formed in a portion of the second bank-like rib, and the first portion and the second portion of the conductive sheet member are electrically connected with each other through the notch portion, another surface of the resin molded product has an inclined surface where the second portion is inclined with respect to the first portion, and the conductive sheet member includes blank-out openings which absorb the deformation of the conductive sheet member when the conductive sheet member is applied to the inclined surface.

10. A display device having a two-panel integral-type holder which holds a first display panel on one surface thereof and holds a second display panel having a size smaller than a size of the first display panel on another surface thereof, wherein the two-panel integral-type holder is a resin molded product having a first bank-like rib which is formed on one surface and surrounds at least three sides of a periphery of the first display panel thus defining a first accommodating region and a second bank-like rib which is formed on another surface and surrounds at least three sides of a periphery of the second display panel thus defining a second accommodating region, a conductive sheet member is formed on a first portion of another surface corresponding to the first accommodating region except for the second accommodating region and a second portion of another surface corresponding to the second accommodating region respectively, the conductive sheet member being brought into contact with another surface, and a notch is formed in a portion of the second bank-like rib, and the first portion and the second portion of the conductive sheet member are electrically connected with each other through the notch portion, another surface of the resin molded product has a stepped portion between the first portion and the second portion, and the conductive sheet member includes blank-out openings which absorb the deformation of the conductive sheet member when the conductive sheet member is applied to the stepped portion.

* * * * *